United States Patent
Rhodes

(10) Patent No.: US 8,179,458 B2
(45) Date of Patent: May 15, 2012

(54) SYSTEM AND METHOD FOR IMPROVED IMAGE PROCESSING

(75) Inventor: Howard E. Rhodes, San Martin, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 380 days.

(21) Appl. No.: 12/578,381

(22) Filed: Oct. 13, 2009

(65) Prior Publication Data

US 2011/0085062 A1 Apr. 14, 2011

(51) Int. Cl.
- H04N 3/14 (2006.01)
- H04N 5/235 (2006.01)
- H04N 5/228 (2006.01)
- G06K 9/00 (2006.01)
- H01L 27/00 (2006.01)

(52) U.S. Cl. ............. 348/279; 348/297; 348/221.1; 348/222.1; 348/246; 348/229.1; 382/162; 382/167; 250/208.1

(58) Field of Classification Search ........... 348/229.1, 348/222.1, 221.1, 234–236, 364, 216.1, 273, 348/296, 297, 223.1, 279, 245, 246, 254; 382/162–167; 250/208.1
See application file for complete search history.

(56) References Cited

U.S. PATENT DOCUMENTS

| | | | | |
|---|---|---|---|---|
| 7,911,507 B2 * | 3/2011 | Egawa et al. | ............. | 348/230.1 |
| 7,928,352 B2 * | 4/2011 | Toda | .......................... | 250/208.1 |
| 8,031,258 B2 * | 10/2011 | Enge et al. | .................... | 348/350 |
| 2005/0248667 A1 * | 11/2005 | Schweng et al. | ............. | 348/234 |

OTHER PUBLICATIONS

Lyon, Richard F. et al., "Eyeing the Camera: into the Next Century", in Proc. IS&T/SID 10th Color Imaging Conference, 2002, 7 pages.

* cited by examiner

*Primary Examiner* — Lin Ye
*Assistant Examiner* — Marly Camargo
(74) *Attorney, Agent, or Firm* — Blakely Sokoloff Taylor & Zafman LLP

(57) ABSTRACT

A system and method for improving image processing. In one aspect of the invention the method includes receiving data indicating an intensity of light incident on a first pixel of a pixel array and determining from the received data if the intensity of incident light on the first pixel satisfies a first condition. A processing operation is performed on data received from a second, third and fourth pixel of the pixel array but skipped on the data received from the first pixel if the first condition is satisfied. The first condition includes whether the first pixel is substantially saturated in response to an intensity of light incident on the first pixel.

19 Claims, 5 Drawing Sheets

SYSTEM AND METHOD FOR IMPROVED IMAGE PROCESSING

TECHNICAL FIELD OF THE INVENTION

The present invention relates generally to image processing, and more particularly, relates to low light image processing.

BACKGROUND OF THE INVENTION

In image processing, dynamic range generally refers to the range of tonal values in a scene that can be captured in the image. Thus, an image having a wide dynamic range will have a wide range of tonal values so that details such as highlights and shadows are easily discernable even in the brightest and darkest portions of the image.

The primary building block of a digital image formed by an image sensor is a pixel. Each individual pixel generally has a color filter above it. The filters are arranged in a pattern over a pixel array on the image sensor. One well known filter pattern is Red, Green, Green, Blue (RGGB). Another pattern, although less widely used is Red, Green, Blue and White (RGBW). The pixels of an image sensor are semiconductor devices such as photodiodes that collect incident light photons in photosites or wells. The photons are transformed into electrical charge that will serve as current signals proportional to the intensity of light or number of photons collected in the well.

The dynamic range of an image sensor is defined as the ratio between the full well capacity of a pixel in the image sensor divided by the noise floor. The full well capacity of the pixel refers to the greatest amount of photons the pixel can hold before saturation, after which information about the image is lost, while the noise floor generally refers to the readout noise of the pixel. Various factors can contribute to limiting the dynamic range of an image sensor. For example, the RGBW pattern is more ideal for low light conditions than the RGGB pattern because it has a pixel specifically for sensing white light. However, because white light includes the full spectrum of visible light, pixels that sense white light saturate much earlier than pixels that sense only red, green or blue wavelengths, thus limiting the dynamic range of the image sensor. These problems are typically made worse the greater the intensity of light.

BRIEF DESCRIPTION OF THE DRAWINGS

Non-limiting and non-exhaustive embodiments of the present invention will be described in the following Figures, wherein like reference numerals refer to like parts throughout the various views unless otherwise specified.

DETAILED DESCRIPTION OF THE ILLUSTRATED EMBODIMENTS

Embodiments of a system and method for improving low light image processing are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "an example" means that a particular feature, structure, or characteristic described in connection with the embodiment is included in at least one embodiment or example of the present invention. Thus, the appearances of the phrases "in one example" or "in an example" in various places throughout this specification are not necessarily all referring to the same embodiment. Furthermore, the particular features, structures, or characteristics may be combined in any suitable manner in one or more example.

In general, a system and method are disclosed herein for improving low light image processing. The RGBW pattern of filters is generally more sensitive at low light conditions than other patterns, such as the widely used RGGB pattern. However, as mentioned above, the white pixel saturates early, limiting the dynamic range of the image sensor. A method and system will be described for processing data received from all four RGBW pixels or only three of the pixels, depending upon whether the white pixel is saturated or crosses a saturation threshold.

Thus, a system and method is disclosed herein for receiving data indicating an intensity of incident light on a first pixel of a pixel array. In one example, the first pixel receives data indicative of incident white light and a second, third and fourth pixel receives data indicative of at least one of incident red, green and blue light. According to the teachings of the present invention, if it is determined that the first pixel is saturated in response to an intensity of light incident on the first pixel, then a first condition is satisfied and the image is reconstructed using data received from the second, third and fourth pixels but without using data received from the first pixel.

If the first pixel does not satisfy the first condition of being saturated, then the image is reconstructed using data received from all four of the pixels. Furthermore, in one example, if the first pixel is saturated, data used in the reconstruction of the image may include estimated data for data received from the first pixel. In one example, this estimated data is substantially a sum of data received from the second, third and fourth pixels.

Figure 1:
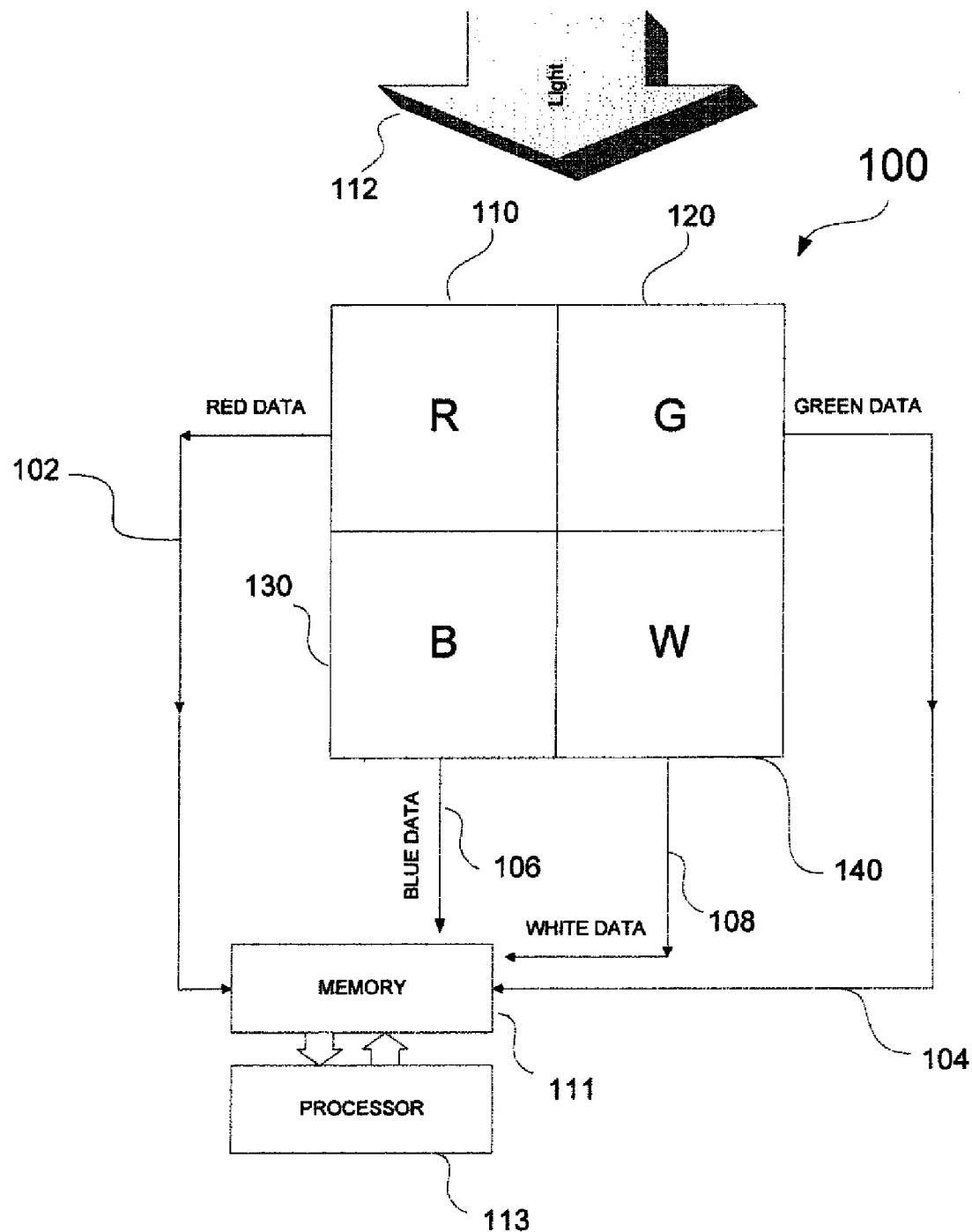
FIG. 1 illustrates a top view of an example portion of a pixel array as well as example respective paths for signals or data received from each of the pixels in accordance with the teachings of the present invention.

Accordingly, FIG. 1 illustrates a top view of an example portion 100 of a pixel array having an RGBW pattern used in connection with a system and method of image processing according to teachings of the present invention. As shown, example "red pixel" 110, "green pixel" 120, "blue pixel" 130 and "white pixel" 140 have been configured with filters that receive only light or photons indicative of incident red, green, blue and white light respectively. During operation, in order to capture an image, pixels 110, 120, 130 and 140 capture incident light 112 during a certain exposure period or integration time.

The electrical charge generated by each pixel 110, 120, 130 and 140 travels along respective paths 102, 104, 106 and 108 to be read out as an analog signal. In the example, a characteristic of the analog signal such as its charge, voltage or current will be read out. As shown, in the example of FIG. 1, the signals are received as data by a memory 111 coupled to an image signal processor (ISP) 113 where image processing operations are performed on the received data. In one example, the memory 111 and ISP 113 are included in an image sensor that includes the pixel array. Thus, in one example, the image processing operations interact with the data in real time.

Figure 2:
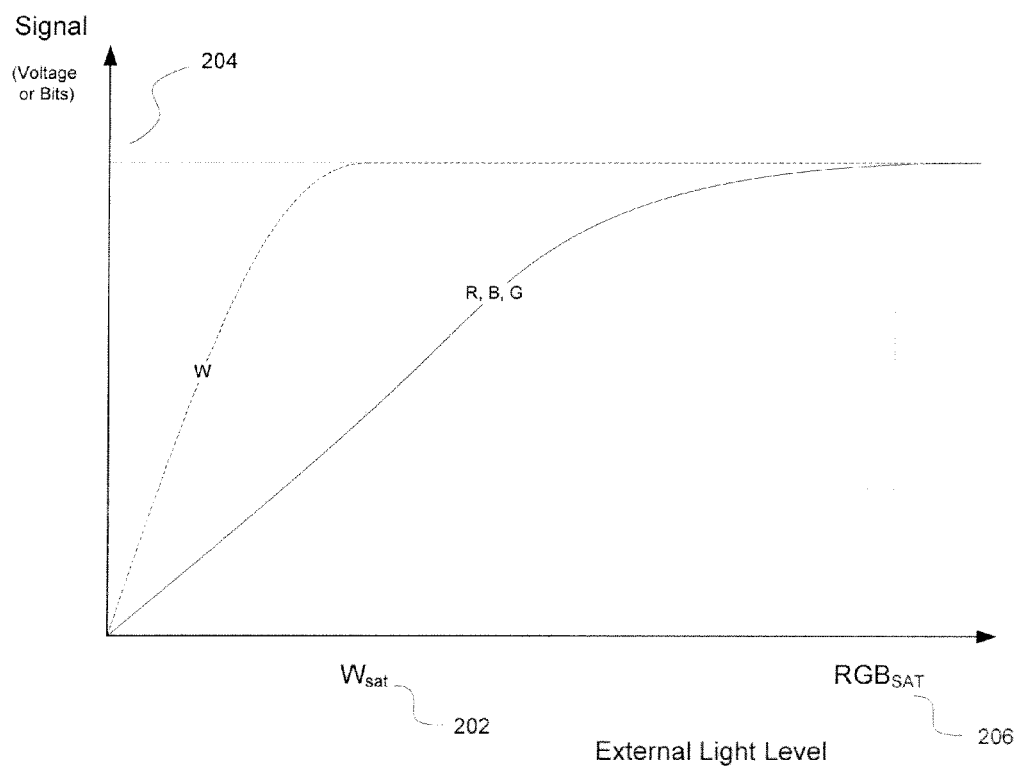
FIG. 2 is an example graph that illustrates an example signal received from a pixel as a function of an external light level in accordance with the teachings of the present invention.

FIG. 2 illustrates an example graph 200 showing an intensity of incident light, also referred to as external light level, on a horizontal axis and a corresponding signal received by a red, green, blue and white pixel on the vertical axis. In the example, at $W_{SAT}$ 202, a white pixel such as white pixel 140 of FIG. 1 is saturated. Beyond this external light level, information about brightness will be lost because the signal of the white pixel is at its maximum signal 204. For example, in an 8-bit pixel, this maximum signal for a pixel corresponds to a value of 255. From the graph 200, in the example, it can be seen that saturation of red pixel 110, green pixel 120, blue pixel 130 does not occur until $RGB_{SAT}$ 206, a much higher external light level than at which white pixel 140 will saturate. For clarity, the signals for red, green and blue pixel 110, 120 and 130 have been combined into one curve.

Therefore, according to the teachings of the present invention, if a first condition is satisfied because a white pixel is saturated in response to an intensity of light incident on the white pixel, such as at $W_{SAT}$ 202, data received from each of a red, green and blue pixel 110, 120 and 130 is used to reconstruct the image but data from white pixel 140 is not used. In one example, data received at white pixel 140 can be substituted for a sum of data received from the red, green and blue pixels 110, 120 and 130. Thus, in the example, this data may be substituted as estimated data for the data actually received from the white pixel 140.

If, however, white pixel 140 is not saturated such as for example when an external light level is less than an example $W_{SAT}$ 202, then data received from white pixel 140 as well as from each of the red, green and blue pixels 110, 120 and 130 is used to reconstruct the image.

Note that in various examples, a threshold for determining whether a pixel is saturated may be set at a saturation level less than 100%. Thus, in various examples, a processing operation to reconstruct the image may be skipped on data received from a white pixel 140 if it reaches a threshold that is set at less than 100% saturation or in other words, if white pixel is substantially saturated. Furthermore, in various examples, an integration time of the white pixel 140 may be limited or reduced in response to a number or percentage of white pixels 140 of a pixel array that are saturated. Thus, in one example, if a significant percentage of white pixels 140 are saturated, an integration time of a white pixel 140 may be limited. In another example, an integration time of red, blue and green pixels 110, 120 and 130 may also be limited in response to a percentage of white pixels 140 that are saturated. In one example, an integration time of the white pixel 140 may be limited to ⅓ an integration time of the red, blue and green pixels 110, 120 and 130.

Figure 3:
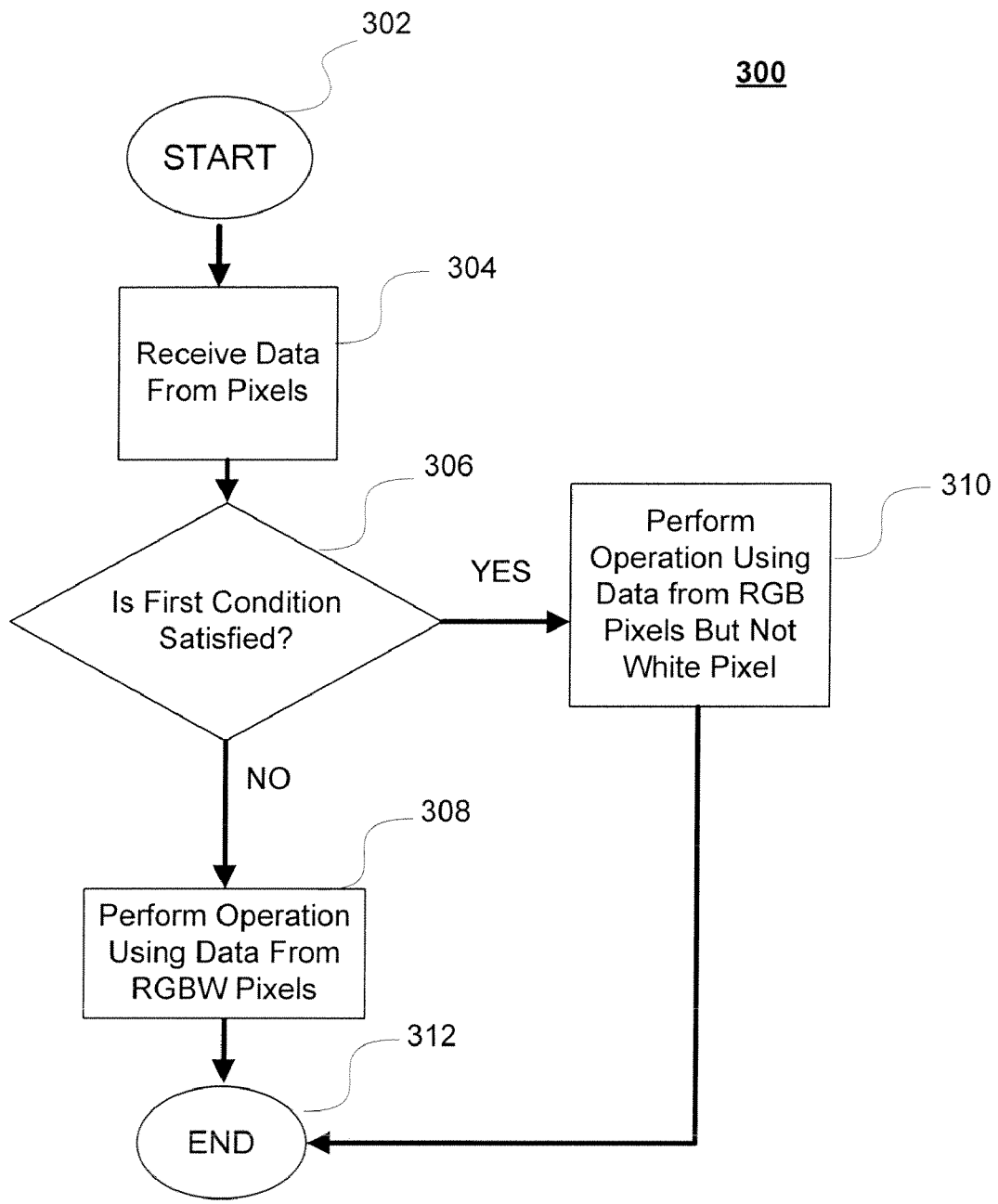
FIG. 3 is a flow diagram illustrating an example method in accordance with the teachings of the present invention.

FIG. 3 is a flow diagram illustrating a method according to the teachings of the present invention. In the example, a process 300 begins at start block 302. At a block 304, data indicating an intensity of incident light is received from pixels such as red, green, blue pixel 110, 120, 130 and white pixel 140. Next, in the example, at a decision block 306, it is determined from the received data whether a first condition is satisfied, such as whether white pixel 140 is saturated.

If the answer is yes then the process moves to a block 310 where a processing operation to reconstruct the image will be performed on data received from a red, green and blue pixel 110, 120 and 130 but not on data received from the white pixel 140. In one example, instead of performing the processing operation on data received from the white pixel 140, the processing operation is performed on estimated data. In one example, the estimated data may include data that is substantially a sum of data received from the red, green and blue pixels 110, 120 and 130 in place of data received from the saturated white pixel 140.

Returning to decision block 306, if the answer is no, and the white pixel 140 is not saturated, then the process moves to a next block 308 where a processing operation to reconstruct the image will be performed on data received from all four pixels—red, green and blue pixels 110, 120 and 130 as well as the data received from the white pixel 140. The process ends at an end block 312.

Figure 4:
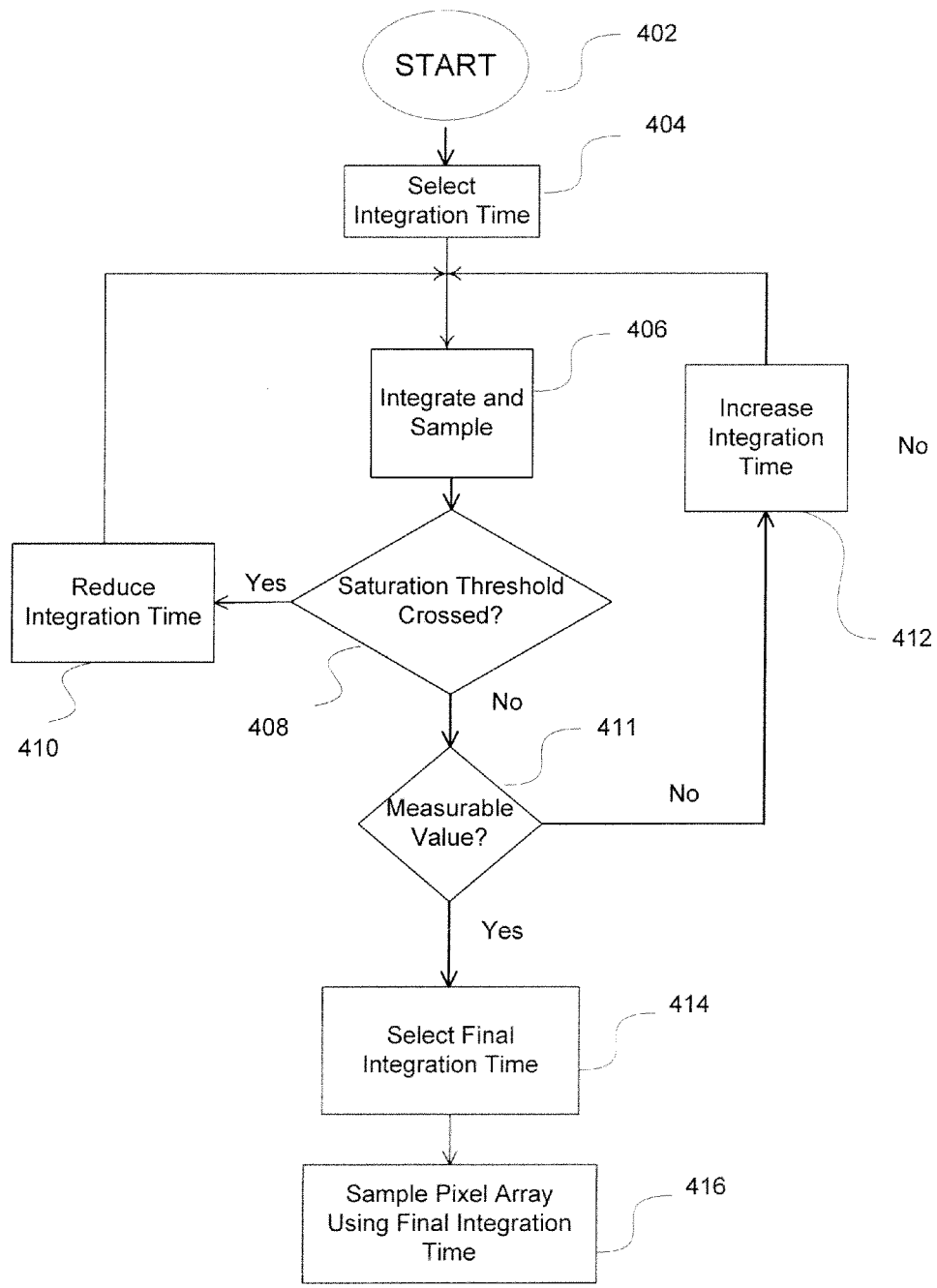
FIG. 4 is a flow diagram illustrating another example method in accordance with the teachings of the present invention.

FIG. 4 is a flow diagram illustrating an alternate embodiment in which an integration time is adjusted according to the teachings of the present invention. For example, according to the embodiment described below, if an intensity of light incident on a pixel causes a percentage saturation of the pixel to cross a saturation threshold, the integration time for the pixel can be reduced so that the saturation threshold is no longer crossed. Alternately, if the percentage saturation of the pixel is too far below or does not reach the saturation threshold or a target measurable value, the integration time can be increased in order to gather more data.

In the example of FIG. 4, a process 400 begins at a start block 402. At a next block 404, an integration time for a pixel such as white pixel 140 is selected. In one embodiment, the integration time selected is a most recent or last integration time used. In one embodiment, an integration time that is selected is based on an average daylight setting.

At a next block 406, integration occurs and white pixel 140 receives light during the selected integration time. Data received from white pixel 140 is then sampled. If, according to the sample, a percentage saturation of white pixel 140 has crossed a saturation threshold at decision block 408, then the process flows to the left where the integration time is reduced at a block 410. In one embodiment, the integration time may be reduced by approximately 50%. Integration with the reduced integration time and sampling of data received from white pixel 140 then occurs at block 406.

Next, at decision block 408, if the results of the sampling are such that the percentage saturation of white pixel 140 still crosses the saturation threshold despite the reduced integration time, the process moves to left block 410 where the integration time is further reduced. The process may continue to loop from 406 through 410 until the integration time is reduced sufficiently such that the intensity of light incident on white pixel 140 does not cause the percentage saturation of white pixel 140 to cross the saturation threshold. Once the saturation threshold is no longer crossed at block 408 (or alternatively, if the saturation threshold was never crossed), the process moves to decision block 411 where it is determined whether the percentage saturation of white pixel 140 reaches a target measurable value for a substantially optimum signal.

Thus, in one example, a target measurable value may be set at at 100% saturation or at a percentage near 100% saturation.

In the example of FIG. 4, if the percentage saturation of white pixel 140 does not reach the target measurable value, the answer at decision block 411 is no. The process then flows to the right where the integration time is increased at a block 412. In one embodiment, the integration time may be increased by an amount estimated for the percentage saturation of white pixel 140 to reach the target measurable value based upon a normalized integration time. For example, in general, an increased integration time corresponds approximately with an increased percentage of saturation for a given pixel. Thus, if white pixel 140 reaches 75% of saturation during an initial integration time, in order for white pixel 140 to reach a target measurable value of 100% saturation, it can be estimated that this is achieved by increasing the integration time by approximately ⅓. In other examples, an increase in integration time can be estimated for a target measurable value at a percentage near saturation but not at 100% saturation, such as for example, 95% saturation.

Accordingly, integration time is increased at a block 412 according to an estimate as described above. At block 406, integration and sampling of data received from the white pixel 140 occurs with the increased integration time. The process thus loops through blocks 406 and 412 until the percentage saturation of white pixel 140 reaches a target measurable value by increasing the integration time at block 412. Note that if the integration time is overestimated and the percentage saturation of white pixel 140 crosses the saturation threshold at 408, the integration time can be reduced by looping between boxes 406-408 as described previously. Once the percentage saturation of white pixel 140 reaches the target measurable value at block 411, the process can move to a block 414 where a final integration time is selected. In the example, this final integration time is the current integration time that was most recently used in block 406.

At a next block 416, substantially an entire pixel array including white pixel 140 can be sampled using the final integration time. Note that substantially sampling the entire pixel array includes, for example, sampling the pixel array such that enough pixels are sampled so that a useable image is captured. Note that although white pixel 140 was used in the example of FIG. 4, an integration time of red, blue, or green pixels may also be adjusted using the same principles.

Figure 5:
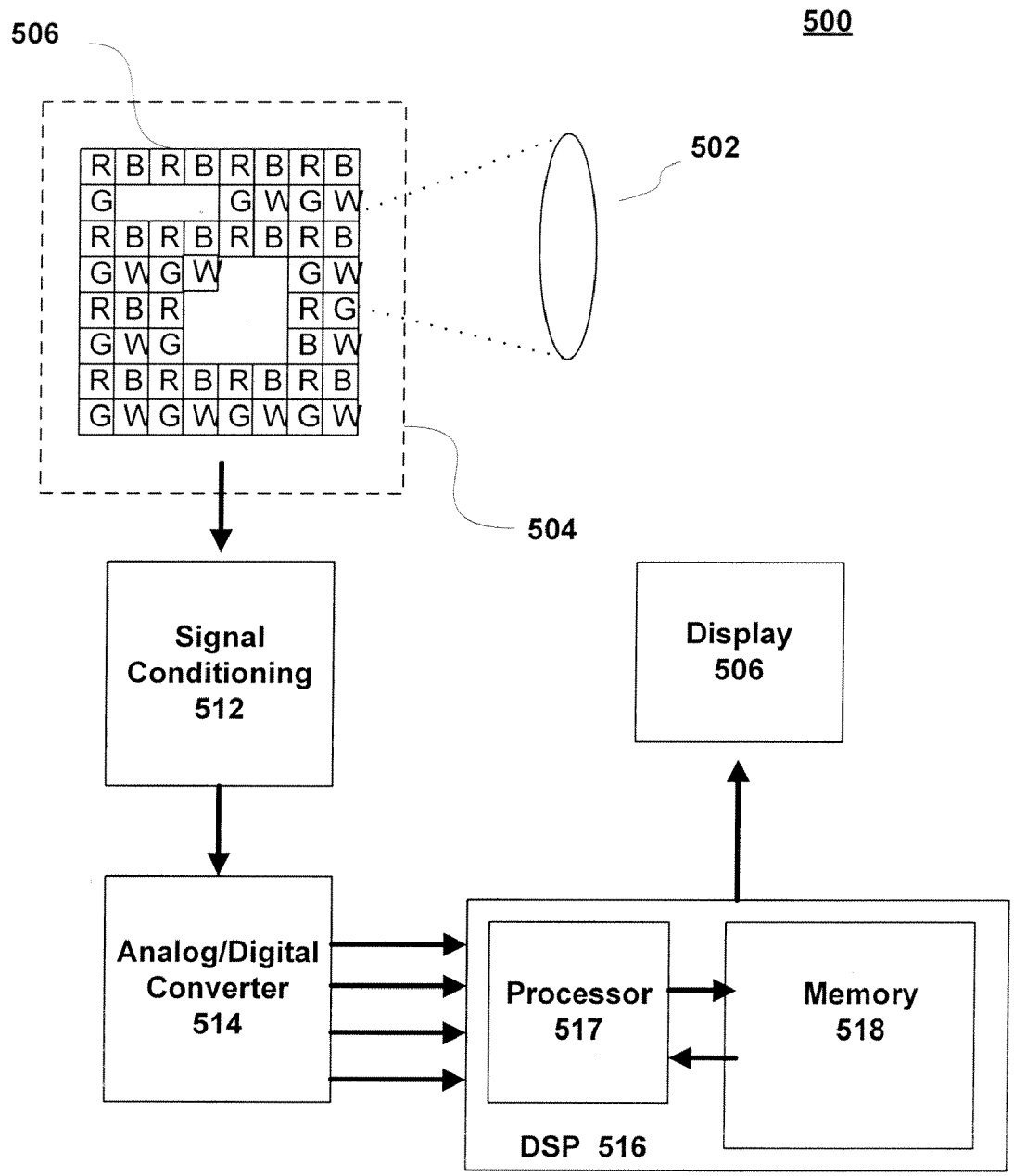
FIG. 5 is a schematic block diagram of an example image sensor and associated imaging system in accordance with the teachings of the present invention.

Finally, FIG. 5 illustrates an example of an imaging system 500 that may employ the method of image processing such as described in FIGS. 3 and 4. As shown in the example, optics 502, which can include refractive, diffractive or reflective optics or combinations of these, may focus an image onto a pixel array 506 of an image sensor 504. Pixel array 506 can include the example red, green, blue and white pixels 110, 120, 130 and 140 of FIG. 1. In one example, the reducing or increasing the integration time of the pixels 110, 120, 130 and 140 as described in connection with FIG. 4 can be accomplished by circuitry and logic within the pixel array 506 or within a circuit coupled to pixel array 506 within image sensor 504.

In the example, signal conditioning 512 is coupled to image sensor 504 to receive and condition analog signals from pixel array 506. Signal conditioner 512 can include various components for conditioning analog signals. Examples of components that can be found in signal conditioner 512 includes filters, amplifiers, offset circuits, automatic gain control, etc. Example analog-to-digital converter (ADC) 514 is coupled to signal conditioner 512 to receive conditioned analog signals corresponding to each pixel in pixel array 506 from signal conditioner 512 and convert these analog signals into digital values.

Digital signal processor (DSP) 516 is coupled to receive digitized pixel data from ADC 514 and process the digital data as described above in connection with FIGS. 3 and 4 to produce a final digital image. As shown in the example, DSP 516 includes a processor 517 that can store and retrieve data in a memory 518. Data in memory 518 may include data, also referred to as information, received at pixels 110, 120, 130 and 140. Once the image has been processed, the final digital image data can be output from DSP 518 to a display unit 506.

In another example, the methods as described in FIGS. 3 and 4 may be implemented by ISP 113 of FIG. 1 that is included in an image sensor such as image sensor 504. In one example, memory 111 may also be included in an image sensor 504 to store an amount of data received from pixels 110, 120, 130 and 140. In one example, approximately two rows of data may be stored in memory 113 so that it may be determined whether one or more of the white pixels 140 is substantially saturated. In one example, data received at the pixels 110, 120, 130 and 140 may continue onto DSP 516 for further processing and storage or display.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
receiving data indicating an intensity of light incident on a first pixel of a pixel array;
determining from the received data if the intensity of light incident on the first pixel satisfies a first condition; and
performing a processing operation on data received from a second, third and fourth pixel of the pixel array but skipping the data processing operation on the data received from the first pixel if the first condition is satisfied,
wherein the data received from the first pixel is indicative of white light,
wherein the first condition is satisfied when the first pixel is substantially saturated in response to an intensity of light incident on the first pixel.

2. The method of claim 1 wherein the data received from the second, third and fourth pixels is indicative of at least one of red, green and blue light.

3. The method of claim 1 further comprising performing the processing operation on data received from the first, second, third and fourth pixels if the first condition is not satisfied.

4. The method of claim 1 wherein determining if the intensity of light incident on the first pixel satisfies the first condition includes determining if the first pixel meets a predetermined saturation threshold.

5. The method of claim 1 wherein the performing the processing operation includes performing a processing operation on data that is substantially a sum of data received at the second, third and fourth pixels in place of the data received from the first pixel if the first condition is satisfied.

6. The method of claim 1 further comprising limiting an integration time of the first, second, third and fourth pixels if the first condition is satisfied.

7. The method of claim 1 further comprising limiting an integration time of the first pixel if the first condition is satisfied.

8. The method of claim 1 further comprising limiting an integration time of a first pixel in response to a number of first pixels in the pixel array that are substantially saturated.

9. The method of claim 1 further comprising limiting an integration time of a second, third and fourth pixel in response to a percentage of first pixels in the pixel array that are substantially saturated.

10. An apparatus, comprising:
an image sensor including a first, second, third and fourth pixel arranged in an array;
a digital signal processor coupled to the image sensor, the digital signal processor comprising:
a memory to have stored therein information received from the first, second, third and fourth pixel of the array, and
a processor coupled to the memory to perform a processing operation on information received at the array, wherein the processing operation is performed on information received from the first pixel if an intensity of light received at the first pixel is below a saturation threshold for the first pixel, wherein the processing operation is not performed on information received from the first pixel if the intensity of the light received from the first pixel crosses the saturation threshold, wherein the information received from the first pixel is indicative of white light.

11. The apparatus of claim 10 wherein the information received from the second, third and fourth pixel is indicative of at least one of red, blue and green light.

12. The apparatus of claim 10 further comprising substituting the information received from the first pixel with information that is substantially a sum of the information received from the second, third and fourth pixels if the intensity of light received from the first pixel crosses the saturation threshold.

13. The apparatus of claim 10 further comprising limiting an integration time of the first pixel in response to a percentage of first pixels of the array that cross the saturation threshold.

14. The apparatus of claim 10 further comprising limiting an integration time of the second, third and fourth pixels in response to a percentage of first pixels of the array that cross the saturation threshold.

15. The apparatus of claim 10 further comprising limiting an integration time of the first pixel to ⅓ an integration time of the second, third and fourth pixel.

16. The apparatus of claim 10 wherein the DSP is an integrated signal processor (ISP) included in the image sensor.

17. A method, comprising:
sampling a first pixel using a first integration time, the first pixel to receive incident white light;
determining from the sampling of the first pixel whether the first pixel is substantially saturated in response to the white light;
adjusting the first integration time to select a second integration time, the selection of the second integration time based on the sampling of the first pixel using the first integration time; and
sampling substantially each of the pixels of a pixel array including the first pixel using the second integration time.

18. The method of claim 17 wherein a second, third and fourth pixel include pixels to receive respectively incident red, blue and green incident light.

19. The method of claim 18 wherein the sampling of the first pixel is estimated using data received from the red, green or blue pixel.

* * * * *